United States Patent
Caunegre

(12) 
(10) Patent No.: US 9,922,146 B2
(45) Date of Patent: Mar. 20, 2018

(54) TOOL APPARATUS, METHOD AND COMPUTER PROGRAM FOR DESIGNING AN INTEGRATED CIRCUIT

(71) Applicant: Pascal Caunegre, Cugnaux (FR)

(72) Inventor: Pascal Caunegre, Cugnaux (FR)

(73) Assignee: NXP USA, Inc., Austin, TX (US)

( * ) Notice: Subject to any disclaimer, the term of this patent is extended or adjusted under 35 U.S.C. 154(b) by 177 days.

(21) Appl. No.: 14/778,107

(22) PCT Filed: Mar. 21, 2013

(86) PCT No.: PCT/IB2013/000703
§ 371 (c)(1),
(2) Date: Sep. 18, 2015

(87) PCT Pub. No.: WO2014/147435
PCT Pub. Date: Sep. 25, 2014

(65) Prior Publication Data
US 2016/0063149 A1 Mar. 3, 2016

(51) Int. Cl.
*G06F 17/50* (2006.01)

(52) U.S. Cl.
CPC ...... *G06F 17/5009* (2013.01); *G06F 17/5036* (2013.01); *G06F 17/5072* (2013.01); *G06F 17/5081* (2013.01); *G06F 2217/10* (2013.01)

(58) Field of Classification Search
CPC .......... G06F 17/5036; G06F 17/5009; G06F 17/5072; G06F 17/5081; G06F 2217/10
See application file for complete search history.

(56) References Cited

U.S. PATENT DOCUMENTS

| | | | |
|---|---|---|---|
| 7,484,195 B1 | 1/2009 | Korobkov | |
| 7,574,682 B2 | 8/2009 | Riviere-Cazaux | |
| 7,640,143 B2 | 12/2009 | Bittner et al. | |
| 8,380,478 B2 | 2/2013 | Houston | |
| 2002/0016704 A1* | 2/2002 | Blanks | G06F 17/5036 703/14 |
| 2002/0072872 A1 | 6/2002 | Chatterjee et al. | |

(Continued)

OTHER PUBLICATIONS

International Search Report and Written Opinion correlating to PCT/IB2013/000703 dated Dec. 24, 2013.

(Continued)

*Primary Examiner* — Vuthe Siek

(57) ABSTRACT

An integrated circuit design tool apparatus includes a processing resource configured to support a circuit simulator, a circuit sensitivity optimizer and a circuit sensitivity calculator. The circuit sensitivity optimizer is adapted to communicate to the circuit simulator a first dynamic list of selected devices of the circuit; and a second dynamic list of selected process parameters associated with the selected devices of the first dynamic list. The circuit simulator is configured to communicate to the circuit sensitivity calculator, a performance metrics of the circuit in response thereto. The circuit sensitivity calculator is configured to determine one sensitivity coefficient for each device of the first dynamic list in response thereto. The circuit sensitivity calculator is further configured to determine and communicate to the circuit sensitivity optimizer a variance of the performance metrics and also adapted to gradually determine whether or not to further communicate with the circuit simulator.

15 Claims, 4 Drawing Sheets

(56) References Cited

U.S. PATENT DOCUMENTS

| | | |
|---|---|---|
| 2004/0193390 A1 | 9/2004 | Drennan et al. |
| 2005/0273308 A1 | 12/2005 | Houston |
| 2008/0195359 A1 | 8/2008 | Barker et al. |
| 2009/0248370 A1 | 10/2009 | Rutenbar et al. |
| 2011/0066997 A1 | 3/2011 | O'Riordan et al. |

OTHER PUBLICATIONS

"Circuit sensitivity analysis in terms of process parameters"; van Dort, M.J.; Klaassen, D.B.M.; Electron Devices Meeting, 1995., International.
"Variability analysis and design of an integrated circuit using sensitivity information"; Haasakker, B.; Jones, I.W.; Electronic Circuits and Systems, IEE Proceedings G ,vol. 129 , Issue: 4.
Lalin Shasipriya et al., 'Computationally Efficient Simulation-based Sensitivity Analysis Method for Power Electronic Circuits', Oct. 12, 2010.
Mihai Iordache et al., 'On the Sensitivity Analysis of Analog Circuits', Annals of the University of Craiova, Electrical Engineering series, No. 32, 2008, pp. 11-16, ISSN 1842-4805,.
EP Application 16305668.2 filed Jun. 8, 2016); not yet published; 18 Pages.
U.S. Appl. No. 14/707,179, filed May 8, 2015, not yet published; 26 Pages.

\* cited by examiner

| Building Block | Devices | First List | Second List | Weighting |
|---|---|---|---|---|
| 1 | M10<0:1> | M10<0> | a | 8 |
|   | M11<0:1> |   |   |   |
|   | M5<0:1> |   |   |   |
|   | M6<0:1> |   |   |   |
| 2 | M1<0:3> | M1<0> | a | 8 |
|   | M2<0:3> |   |   |   |
| 3 | M3<0:3> | M3<0> | a | 8 |
|   | M4<0:3> |   |   |   |
| 4 | M12 | M12 | a | 2 |
|   | M14 |   |   |   |
| 5 | M13 | M13 | a | 2 |
|   | M15 |   |   |   |
| 6 | M7 | M7 | a | 1 |
| 7 | M8 | M8 | a | 1 |
| 8 | M9 | M9 | a | 1 |
| Number of simulations |   |   | 8 |   |

FIG. 4B

| Building Block | Devices | First List | Second List | Weighting |
|---|---|---|---|---|
| 1 | M10<0:1> | M10<0> | b, c, d, e, f, g, h, i, j | 8 |
|   | M11<0:1> |   |   |   |
|   | M5<0:1> |   |   |   |
|   | M6<0:1> |   |   |   |
| 2 | M1<0:3> | M1<0> | b, c, d, e, f, g, h, i, j | 8 |
|   | M2<0:3> |   |   |   |
| 3 | M3<0:3> | M3<0> | b, c, d, e, f, g, h, i, j | 8 |
|   | M4<0:3> |   |   |   |
| ~~4~~ | ~~M12~~ | ~~M12~~ | ~~a~~ | ~~2~~ |
|   | ~~M14~~ |   |   |   |
| ~~5~~ | ~~M13~~ | ~~M13~~ | ~~a~~ | ~~2~~ |
|   | ~~M15~~ |   |   |   |
| 6 | M7 | M7 | b, c, d, e, f, g, h, i, j | 1 |
| 7 | M8 | M8 | b, c, d, e, f, g, h, i, j | 1 |
| 8 | M9 | M9 | b, c, d, e, f, g, h, i, j | 1 |
| Number of simulations |   |   | 54 |   |

FIG. 4C

| Building Block | Devices | First List | Second List | Weighting |
|---|---|---|---|---|
| 1 | ~~M10<0:1>~~ | ~~M10<0>~~ | ~~b, c, d, e, f, g, h, i, j~~ |   |
|   | M11<0:1> | M11<0> | a, b, c, d, e, f, g, h | 2 |
|   | M5<0:1> | M5<0> | a, b, c, d, e, f, g, h | 2 |
|   | M6<0:1> | M6<0> | a, b, c, d, e, f, g, h | 2 |
| 2 | ~~M1<0:3>~~ | ~~M1<0>~~ | ~~b, c, d, e, f, g, h, i, j~~ |   |
|   | M2<0:3> | M2<0> | a, b, c, d, e, f, g, h | 4 |
| 3 | ~~M3<0:3>~~ | ~~M3<0>~~ | ~~b, c, d, e, f, g, h, i, j~~ |   |
|   | M4<0:3> | M4<0> | a, b, c, d, e, f, g, h | 4 |
| ~~4~~ | ~~M12~~ | ~~M12~~ | ~~a~~ | ~~2~~ |
|   | ~~M14~~ |   |   |   |
| ~~5~~ | ~~M13~~ | ~~M13~~ | ~~a~~ | ~~2~~ |
|   | ~~M15~~ |   |   |   |
| ~~6~~ | ~~M7~~ | ~~M7~~ | ~~b, c, d, e, f, g, h, i, j~~ | ~~1~~ |
| ~~7~~ | ~~M8~~ | ~~M8~~ | ~~b, c, d, e, f, g, h, i, j~~ | ~~1~~ |
| ~~8~~ | ~~M9~~ | ~~M9~~ | ~~b, c, d, e, f, g, h, i, j~~ | ~~1~~ |
| Number of simulations |   |   | 40 |   |

TOOL APPARATUS, METHOD AND COMPUTER PROGRAM FOR DESIGNING AN INTEGRATED CIRCUIT

FIELD OF THE INVENTION

This invention relates to a design tool apparatus, a method and a computer program product for designing an integrated circuit that, for example, improves circuit sensitivity calculations of the circuit.

BACKGROUND OF THE INVENTION

The semiconductor industry is continually striving to improve yield and reliability of semiconductor products, such as for example transistors and resistors, thus leading to faster and more complex integrated circuits (ICs). Indeed, as technology scales down, it is continuously required to decrease the device geometries in order to achieve the desired circuit functions, power consumption and operation speed, for example. For such high performance ICs used in circuit design, the statistical variations of the manufacturing process parameters associated with the manufacturing process for the IC, the devices located therein may vary significantly from given specifications, thus resulting in corresponding fluctuations in circuit performance metrics.

There is thus a need to provide a way to predict circuit performance metrics with respect to process parameter variations, prior to the actual manufacture of the circuit.

One of the commonly used tools to assess circuit performance metrics are based on Monte Carlo simulation technique wherein multiple process parameters are varied simultaneously based on underlying probability distributions of the process parameters. Unfortunately, such tools require a large number of circuit simulations to provide a desired level of confidence in the calculated statistics of the performance metrics. This is due, mainly, to numerous process parameters associated with the devices.

An alternative to the Monte Carlo simulation technique is the circuit sensitivity analysis. Circuit sensitivity analysis is a powerful tool for predicting significant process parameters of a circuit which contribute to circuit performance metrics variability and which ultimately affect the yield of the circuit. Circuit sensitivity analysis may be based on sensitivity coefficients which may be defined as being the small fractional change in a circuit performance metrics with respect to a fractional change in the value of any one of the process parameters of the circuit. Namely, if a small change in a process parameter results in a relatively large change in a circuit performance metrics, the circuit performance metrics is considered to be sensitive to the process parameters. Conversely, if a small change in a process parameter results in a relatively small change in a circuit performance parameter metrics, the circuit performance metrics is considered not to be sensitive to the process parameters. Therefore, a circuit design engineer may be guided by such circuit sensitivity analysis results in his tasks in, for example, choosing elementary devices which are the most influential on the performance metrics of a final circuit.

Numerous methods are known for performing circuit sensitivity analysis. One method is the one-factor-at-a-time (OAT) method also known as the "brute-force" method, in which process parameters are varied individually in turn by a fixed percentage, e.g. 5 percent or 10 percent, around a nominal value of the process parameters, while holding all other process parameters constant at their nominal values, wherein nominal values may be provided by the foundry. Then for each process parameter variation, a circuit sensitivity simulation is performed and the sensitivity of one or more circuit performance metrics is calculated. Hence, for m process parameters, this method requires m+1 simulations, one for the nominal value and one for the variation of a process parameter. However, OAT method is also computationally expensive since the number of simulations is tightly related to the number of process parameters and also to the number of devices of the circuit under design.

SUMMARY OF THE INVENTION

The present invention provides a design tool apparatus, a method and a computer program product for designing an integrated circuit as described in the accompanying claims. Specific embodiments of the invention are set forth in the dependent claims. These and other aspects of the invention will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

FIGS. 3A-3C are flow charts illustrating examples of a method of designing an integrated circuit used by the apparatus of FIG. 1.

FIGS. 4A-4C are tables illustrating embodiments of a method of designing an integrated circuit as elucidated with reference to FIGS. 3A-3C, respectively.

DETAILED DESCRIPTION OF THE PREFERRED EMBODIMENTS

Because the illustrated embodiments of the proposed solution may for the most part, be implemented using electronic devices and circuits known to those skilled in the art, details will not be explained in any greater extent than that considered necessary for the understanding and appreciation of the underlying concepts of the present invention, in order not to obfuscate or distract from the teachings of the present invention.

Figure 1:
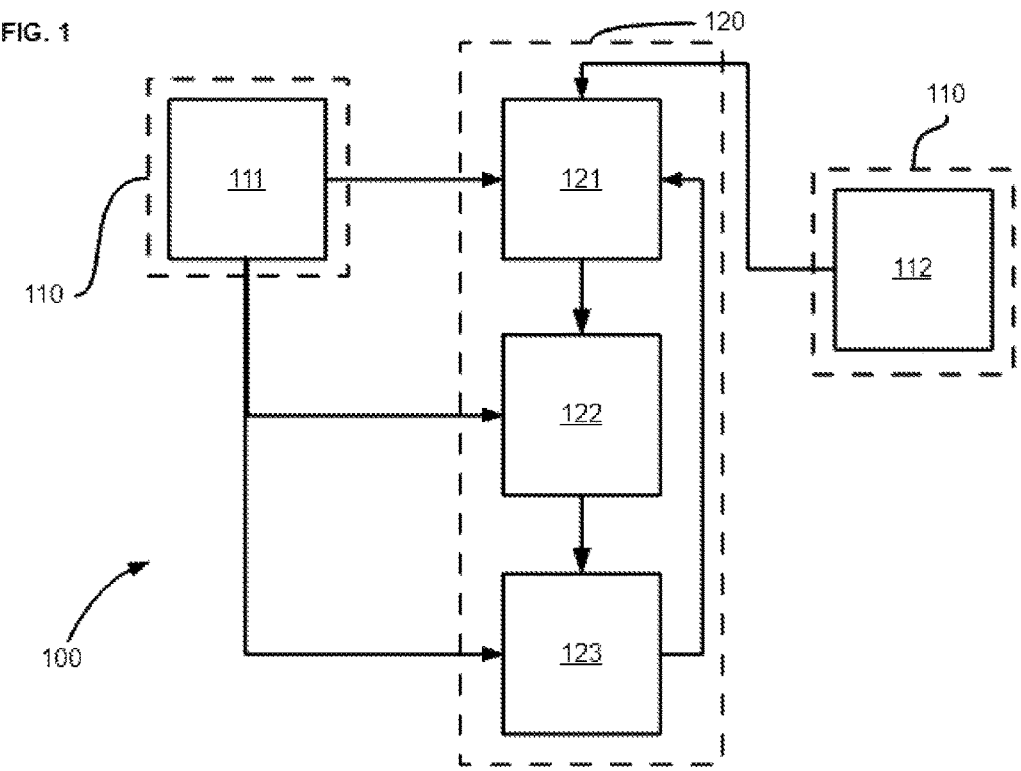
FIG. 1 is a schematic block diagram of an embodiment of a design tool apparatus for designing an integrated circuit.

Referring to FIG. 1, there is diagrammatically shown therein an example integrated circuit design tool apparatus 100. The apparatus as shown comprises:

a processing resource, for example a processor 120 of a general purpose Personal Computer (PC) or any other similar processing apparatus, such as e.g. a microcontroller;

a storage device, for example a memory of the PC, such as a digital memory 110 of e.g. a volatile type, such as a RAM, SRAM, SDRAM, etc.;

a simulation engine, for example a circuit simulator 122 operably coupled to the processor 120 which may be implemented as a software module or a combination of software and hardware, for instance;

an sensitivity optimisation engine, for example a circuit sensitivity optimiser 121 operably coupled to the processor 120 which may be implemented as a software module or a combination of software and hardware, for instance; and, a sensitivity engine, for example a circuit sensitivity calculator 123 operably coupled to the processor 120.

The digital memory 110 is operably coupled to the processor 120. The digital memory 110 is adapted to store, for example, a circuit design data 111 and a circuit specification data 112. In examples of embodiments, the circuit design data 111 may comprise electrical schematic data defining, for example, interconnections between elementary devices, such as MOSFETs (Metal Oxide Semiconductor Field Effect Transistors), capacitors, resistors, etc. In this example, further, the circuit specification data 112 may comprise tolerances associated with performance metrics of at least some of the elementary devices of the circuit, such as at least part of those defined in the circuit design data 111.

The circuit simulator 122 is operably coupled to the circuit sensitivity optimiser 121 and the circuit sensitivity calculator 123. The circuit simulator 122 may be, for example, a circuit simulation software readily available on the market, such as SPICE (Simulation Program with Integrated Circuit Emphasis), for instance. However, it will be appreciated by the skilled person that other circuit simulators may be employed as well. The circuit simulator 122 is capable of accessing the circuit design data 111.

The circuit sensitivity optimiser 121 is operably coupled to the circuit simulator 122 and the circuit sensitivity calculator 123 and is capable of accessing the circuit design data 111 and the circuit specification data 112. The circuit sensitivity calculator 123 is operably coupled to the circuit simulator 122 and the circuit sensitivity optimiser 121, and is capable of accessing the circuit design data 111.

Although not shown in the drawings, the processor 120 may further support a user interface to allow a user, for example a design engineer, to provide at least the circuit sensitivity optimiser 121 with various input and control data, for example, to enable the integrated circuit design tool 100 to improve the circuit sensitivity calculations of a given electronic circuit.

Figure 2:
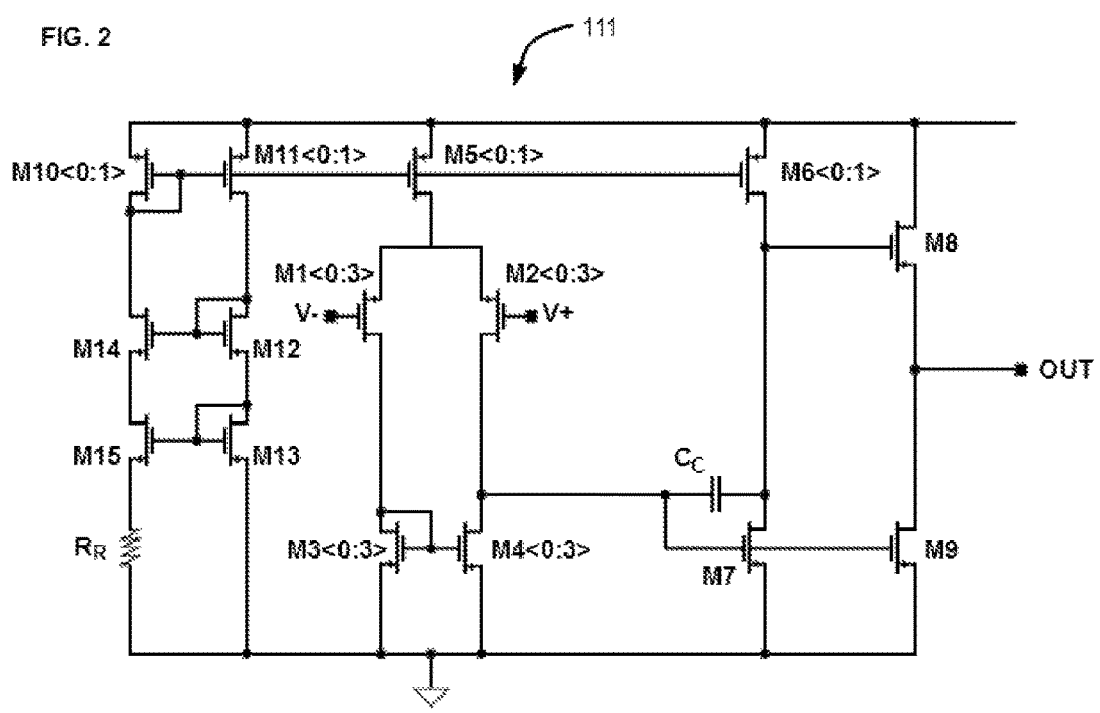
FIG. 2 is a circuit diagram of an example of circuit design data of an integrated circuit data which may be used by the apparatus of FIG. 1.

Referring now to FIG. 2, there is shown therein a circuit diagram of an example of a circuit design data 111 of an integrated circuit used by the apparatus of FIG. 1. In the example, the data 111 define the electronic circuit as shown in FIG. 2, comprising an arrangement of elementary devices such as MOSFETs, for instance. In the shown example, the circuit design data 111 represents an amplifier and comprises electrical schematic data defining, for example, interconnections between the following devices:

MOSFETs M1, M2, M3, M4, M5, M6, M7, M8, M9, M10, M11, M12, M13, M14, M15;

capacitors $C_C$; and, resistors $R_R$.

In this example, an exemplary notation is used therein to facilitate the distinction between:

single devices such as single MOSFETs M7, M8, M9, M12, M13, M14, M15; and, groups of devices such as groups of MOSFETs M1, M2, M3, M4, M5, M6, M10, M11.

For example, the notation M1≺0:3≻ is used to reference the device M1 comprises a group of four MOSFETs, i.e. M1≺0≻, M1≺1≻, M1≺2≻ and M1≺3≻. In the shown example, further, the notation M11≺0:1≻ is used to reference the device M11 comprises a group of two MOSFETs, i.e. M11≺0≻ and M11≺1≻. It will be appreciated by a skilled person that a group of devices may be a group of parallel devices.

In the example as shown in FIG. 2, the circuit design data 111 therefore defines:

31 MOSFETs (i.e. M1[4 MOSFETs]+M2[4 MOSFETs]+M3[4 MOSFETs]+M4[4 MOSFETs]+M5[1 MOSFETs]+M6[2 MOSFETs]+M7[1 MOSFET]+M8[1 MOSFET]+M9[1 MOSFET]+M10[2 MOSFETs]+M11[2 MOSFETs]+M12[1 MOSFET]+M13[1 MOSFET]+M14[1 MOSFET]+M15[1 MOSFET]);

one capacitor $C_C$; and, one resistor $R_R$.

In this example, one or more process parameters, for example process parameters characterising the manufacturing process of the devices, may be associated with each elementary device. For example, process parameters such as the oxide thicknesses, dopant concentrations, flatband voltage and sheet resistance may be associated to a MOSFET device. However, the above example is not intended to be limiting, and it will be appreciated that other process parameters may alternatively or additionally be considered as well.

In order to exemplify the process of performing sensitivity analysis, both the prior art and then the proposed solution will now be presented with respect to the exemplary circuit design data 111 of FIG. 2. In FIG. 2, there will be considered the 31 MOSFETs, each being associated with 10 process parameters. However, the description which follows applies to other devices such as the capacitor $C_C$ and the resistor $R_R$ as well.

In a prior art method such as the so-called "brute-force" method, circuit sensitivity analysis would require 310 simulations (i.e. 31 MOSFETs×10 process parameters). By considering, for example, that one simulation last 10 seconds, performing circuit sensitivity analysis for the whole circuit design data 111 hence requires more than 51 minutes of calculations (i.e. 31 MOSFETs×10 process parameters×10 seconds). In other words, it means that, for example, once the simulation procedure is launched, the design engineer has to wait almost an hour before being able to modify the circuit design data 111, based on the circuit sensitivity calculations results and in the case where a given yield of the circuit is not achieved. As already explained above, such method is computationally expensive and also time consuming, and therefore it is not unusable for most of circuit design data 111 defining complex electronic circuits.

Thereinafter, regarding the proposed solution, reference will be made to FIGS. 3A-3C, which are flow charts illustrating examples of a method of designing an integrated circuit used by the apparatus of FIG. 1. Reference will also be made, for illustration, to the accompanying FIGS. 4A-4C wherein there are shown tables illustrating embodiments of the method with respect to the example of circuit design data 111 as shown in FIG. 2 and as elucidated with reference to FIGS. 3A-3C, respectively.

The method of designing an integrated circuit used by the apparatus of FIG. 1 may be, for example, organised into three phases, of which:

a first phase will be described below with reference to the example of embodiment of FIG. 3A with the accompanying table of FIG. 4A;

a second phase will be described below with reference to the example of embodiment of FIG. 3B with the accompanying table of FIG. 4B; and, a third phase will be described below with reference to the example of embodiment of FIG. 3C with the accompanying table of FIG. 4C.

Figure 3A:
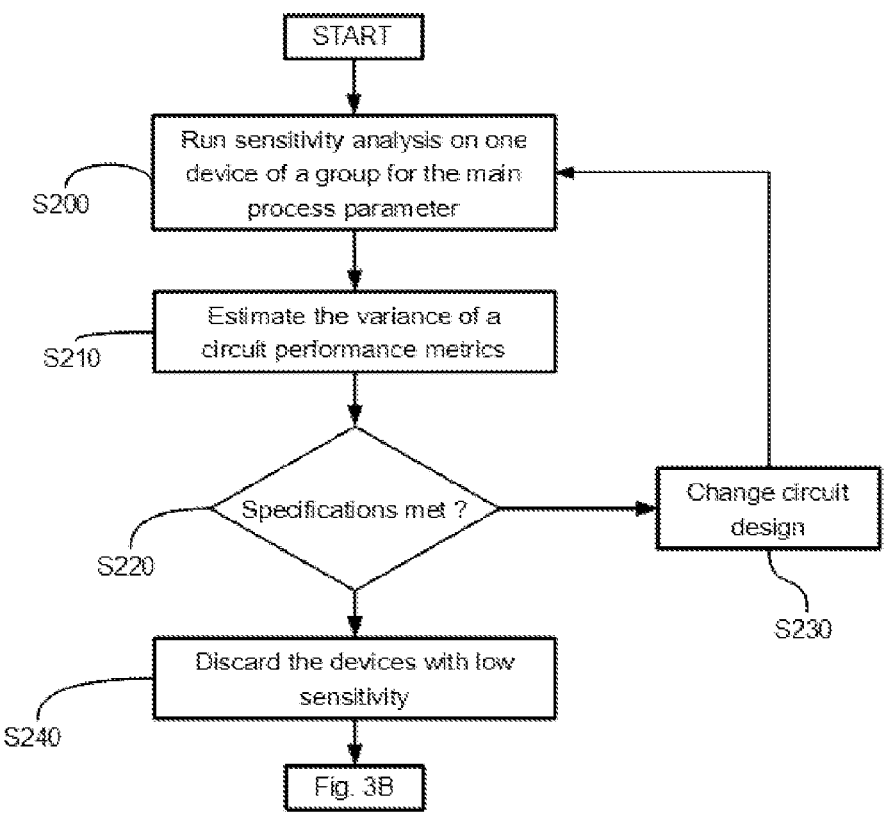

Referring now to the embodiment of FIG. 3A, in a first phase of the method, the exemplary circuit design data 111 may be communicated to the circuit sensitivity optimiser 121. In the shown example of FIG. 4A, 31 MOSFETs M1, M2, M3, M4, M5, M6, M7, M8, M9, M10, M11, M12, M13, M14, M15 of the circuit design data 111 are considered. A grouping information associated with the circuit design data 111 may be communicated to the circuit sensitivity optimiser 121, as part of this first phase. The grouping information may define groups of devices that may comprise, for example, devices arranged in parallel.

Figure 3B:
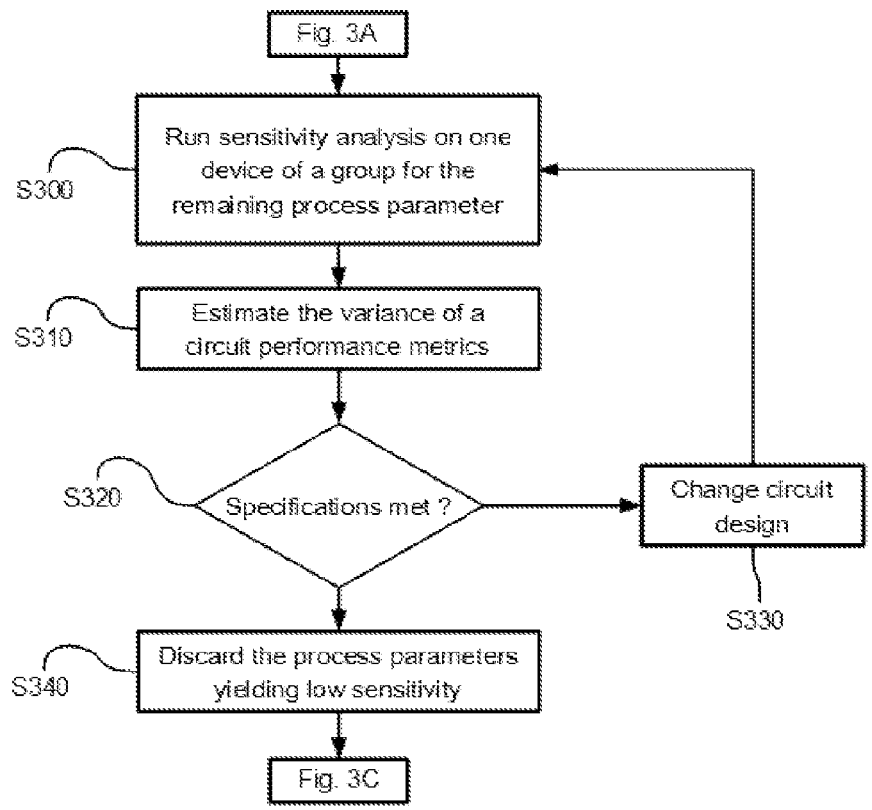
Figures 3C, 4A:
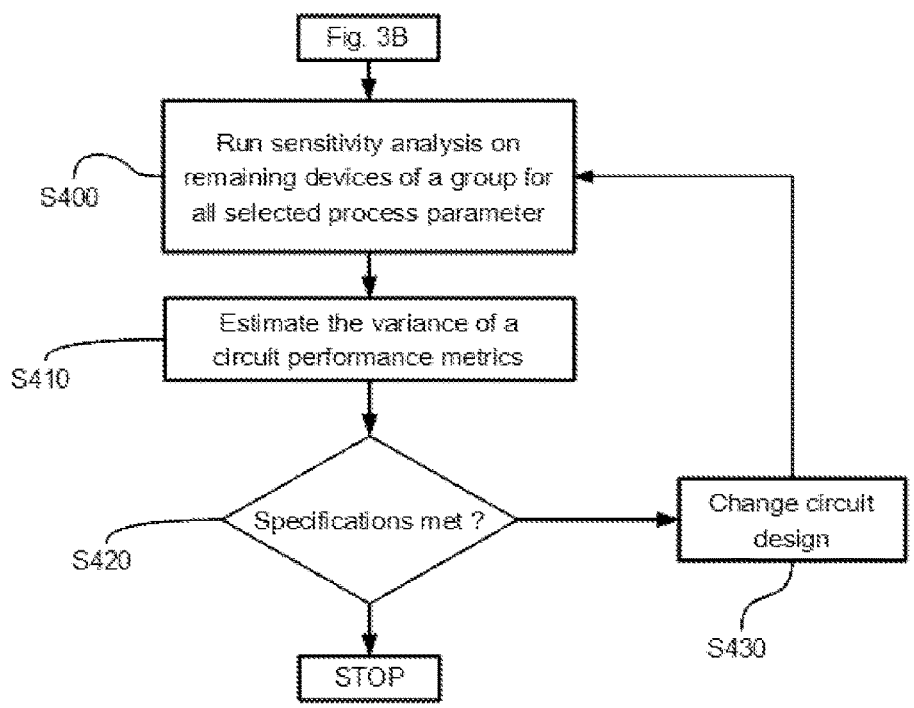

As indicated in FIG. 4A, the grouping information may comprise information indicating that the device M1 comprises four parallel devices with respect to the the notation M1 ≺ 0:3≻ as already explained above. For the sake of completeness of the present disclosure, it will be appreciated that the grouping information may comprise information indicating that each of the devices M2, M3, M4 comprises four devices and each of the devices M5, M6, M10, M11 comprises two devices.

Further, a building blocks information associated with the circuit design data 111 may be communicated to the circuit sensitivity optimiser 121. The building blocks information may define building blocks of devices comprising, for instance, one or more current branches wherein current is balanced between the branches such as a current mirror circuit structure or a differential pair circuit structure, for example.

As indicated in FIG. 4A, the building blocks information may comprise information indicating that each of the following building blocks of devices:

(M1 and M2) is forming a differential pair of transistors; and, (M10, M11, M5 and M6) and (M3, M4) is forming a current mirror circuit structure.

As shown in the first column of the example of FIG. 4A, the 31 MOSFETs are arranged into eight building blocks.

The grouping information and the building blocks information may have been determined beforehand, either manually or automatically, for example. Namely, a user may have manually identified the different groups and/or building blocks of devices of the circuit design data 111. This operation may have been performed using, for example, a Graphical User Interface (GUI) of the design tool apparatus. Possibly, the different groups and/or building blocks of devices may have been automatically detected using, for example an automated detection tool apparatus, with respect to the circuit design data 111, and which is adapted to recognise the groups and/or building blocks of devices of the circuit design data 111.

Further in the first phase, in S200, a circuit sensitivity analysis may be performed on a first dynamic list of selected devices and a second dynamic list of selected process parameters.

The selected devices of the first dynamic list may have been chosen with respect to, for example the circuit design data 111, the grouping information and/or the building blocks information. Namely, for example, the circuit sensitivity optimiser 121 may communicate to the circuit simulator 122 with respect to one device among a building block of devices such that one device from each building block is selected into the first dynamic list.

In fact, it is assumed that the contribution of each device belonging to the same building block, with respect to a performance metrics, is substantially the same.

Therefore, as indicated in FIG. 4A:
M10 is selected from the building block 1;
M1 is selected from the building block 2;
M3 is selected from the building block 3;
M12 is selected from the building block 4;
M13 is selected from the building block 5;
M7 is selected from the building block 6;
M8 is selected from the building block 7; and,
M9 is selected from the building block 8.

The selection of device out of a building block may be arbitrary, random or may be based upon any appropriate selection scheme.

Additionally, when the selected device of a building block comprises, for example, a group of parallel devices, the circuit sensitivity optimiser 121 may communicate to the circuit simulator 122 with respect to one device among the group of parallel devices. In fact, it is assumed that the contribution of each device belonging to a group of parallel devices, with respect to a performance metrics, is exactly the same.

Therefore, as indicated in FIG. 4A:
M10 ≺ 0≻ is selected from the building block 1;
M1 ≺ 0≻ is selected from the building block 2; and,
M3 ≺ 0≻ is selected from the building block 3.

Further in the first phase of the method, it may be selected in the second dynamic list a main process parameter out of all process parameters associated with the devices of the first dynamic list. The main process parameter may be the one known to have the highest relative importance in the deviation in the performance metrics of the circuit with respect to a given integrated circuit design kit. However, the skilled person will appreciate that more than one process parameters may be considered as being among a group of main process parameters. For example, it may be selected two or more main process parameters that contribute to about 40% to 50% in the deviation of a given performance metrics.

As shown in the example of FIG. 4A, 10 process parameters a, b, c, d, e, f, g, h, i, j associated with each MOSFET are considered. However, the skilled person should appreciate that more or less than 10 process parameters may be considered as well.

Thus, in the shown example the circuit sensitivity optimiser 121 may select the main process parameter "a" into the second dynamic list.

Back to FIG. 3A, in S200, the selected main process parameter of the second dynamic list may have been chosen manually or automatically, for example. In this example, a user may have manually identified a ranking of the process parameters with respect to their known importance in the deviation in the performance metrics of the circuit and with respect to a given integrated circuit design kit. This operation may have been performed using, for example, the Graphical User Interface (GUI). In this example as well, the main process parameter may have been automatically detected using, for example an automated detection tool apparatus with respect to a given integrated circuit design kit.

Further, in response to the reception of the first and second dynamic lists, the circuit simulator 122 may calculate and communicate to the circuit sensitivity calculator 123 at least one calculated performance metrics of the circuit design data 111 for each selected device of the first dynamic list with respect to the main parameter of the second dynamic list. However, more than one performance metrics may be considered. As shown in the example of FIG. 2 wherein the circuit design data 111 represents an amplifier, the following performances metrics may be considered: Gain Bandwidth Frequency, Slew Rate or Gain Margin, for example. Other or further performance metrics may be considered as well, such as the Phase Margin, Output Swing or Power Dissipation.

In S210, the circuit sensitivity calculator 123 calculates a variance of the calculated performance metrics and communicates this variance back to the circuit sensitivity optimiser 121. The variance may be calculated with respect to sensitivity coefficients associated with the selected devices, wherein a sensitivity coefficient of a device corresponds to the deviation of the performance metrics due to a variation in at least one process parameter associated with the device, with respect to its nominal value. In practice, for example, each process parameter may be varied in turn by the circuit sensitivity optimiser 121, by a small amount around the nominal value prior communicating with the circuit simulator 122.

Sensitivity coefficients calculation may involve the determination of a first-order partial derivatives of the performance metrics with respect to a process parameter associated with a device as expressed by the following formula:

$$S_i^f = \frac{\partial f}{\partial x_i} \quad (1)$$

where:

f is a performance metrics; and, $x_i$ is the $i^{th}$ process parameters associated with said device.

Possibly, the sensitivity coefficient may be normalized to take into account the difference in magnitude between the performance metrics and the process parameters, for example, as expressed by the following formula:

$$S_i^f = \frac{x_i}{f} \frac{\partial f}{\partial x_i}. \quad (2)$$

Then, the variance may be calculated with respect to the following formula:

$$\sigma^2 = \sum_i n \times \left(S_i^f\right)^2 \times \sigma_{x_i}^2 \quad (3)$$

where:

$\sigma^2$ is the variance of the performance metrics;

$S_i^f$ is the sensitivity coefficient of the $i^{th}$ process parameter for a performance metrics f;

n is the number of devices within a building block; and, $\sigma_{x_i}^2$ is a known variance of the $i^{th}$ process parameter with respect to its nominal value.

As indicated in FIG. 4A, 8 simulations may be performed to obtain the variance using formula (3) as explained above with reference to the example considered herein. The number of devices within each building block is represented by the "Weighting" field in the table of FIG. 4A. For example, building block 1 has a weighting of 8 corresponding to the total number of devices in the building block. The determining of the number of devices within a building block based on the notation used in FIG. 4A has already been elucidated above and this description will not be repeated here.

In S220, the circuit sensitivity optimiser 121 compares the variance of the performance metrics with, for example, a given tolerance value associated with a predefined circuit specification data 112 associated with the performance metrics. In one example, if the variance of the performance metrics does not match the given tolerance value, then the user may be invited to change the circuit design in S230 prior to running again the circuit sensitivity analysis in S200. Therefore, the skilled person would appreciate that the proposed method may be stopped at an early stage without having to wait for a thorough sensitivity of all devices of the circuit. Namely, right after 8 simulations have been performed, a design engineer may be informed whether or not he/she should change its design, for example via a prompt message presented through the GUI. This contrast with the teachings of the prior art where at least 310 simulations are needed to be run before making such decision as explained above. However, if the variance of the performance metrics matches the given tolerance value, then in S240, some devices of the first dynamic list can be discarded and the circuit sensitivity analysis is allowed to proceed to the second phase of the method. Namely, devices of the first dynamic list yielding, in the first phase of the method, a sensitivity coefficient lower than a first value may be deselected, i.e. removed from the first dynamic list for the subsequent phases of the method. In the example of FIG. 4A, it is assumed that the devices M12 and M13 are both yielding a sensitivity coefficient lower than a first value. As already explained above, such devices may be deselected from the first dynamic list as indicated in FIG. 4B.

Referring now to FIG. 3B, in a second phase of the method, in S300, performance of the circuit sensitivity analysis may be continued with respect to the first dynamic list which has been modified in the first phase of the method by deselecting some devices as indicated in FIG. 4B by the strikethrough texts. In the second phase of the method, the second dynamic list is modified by adding some or all of the remaining process parameters associated with the devices of the first dynamic list which are different from the main parameter and therefore have not been taken into consideration in the first phase of the method. In the shown example of FIG. 4B, the process parameters "b", "c", "d", "e", "f", "g", "h", "i" and "j" are selected and added to the second dynamic list.

Further, in response to the reception of the first and second dynamic lists, the circuit simulator 122 may calculate and communicate to the circuit sensitivity calculator 123 at least one calculated performance metrics of the circuit design data 111 as already explained above with respect to the first phase of the method.

In S310, the circuit sensitivity calculator 123 calculates and communicates back to the circuit sensitivity optimiser 121, a variance of the calculated performance metrics as already explained above with respect to the first phase of the method. As indicated in FIG. 4B, 54 simulations (i.e. 9*6) may be performed to obtain the variance using formula (3) as explained above. The number of devices within building blocks comprising multiple branches is represented by the "Weighting" field as already explained above.

In S320, the circuit sensitivity optimiser 121 compares the variance of the performance metrics with, for example, a given tolerance value associated with a predefined circuit specification data 112 associated with the performance metrics. Hence, if the variance of the performance metrics does not match the given tolerance value, then the user may be invited to change the circuit design in S330 prior to running again the circuit sensitivity analysis in S300 with respect to the modified circuit design. Therefore, the skilled person would appreciate that the proposed method may be stopped at an early stage without having to wait for a thorough sensitivity analysis of all devices of the circuit as explained above. However, if the variance of the performance metrics matches the given tolerance value, then in S340, some process parameters of the modified second dynamic list would be discarded and the circuit sensitivity analysis would proceed to a third phase of the method. Namely, process parameters of the second dynamic list yielding, in the second phase of the method, a sensitivity coefficient lower than a second value may be discarded for the remaining phase of the method. In the example of FIG. 4B, it is assumed that the process parameters "i" and "j" are both yielding a sensitivity coefficient lower than the second value. As already explained above, such process parameters may be deselected from the second dynamic list as indicated in FIG. 4C by the strikethrough texts.

Referring now to FIG. 3C, in a third phase of the method, in S400, performance of the circuit sensitivity analysis may be continued with respect to the first and second dynamic lists obtained at the end of the second phase of the method. In the third phase of the method, the first dynamic list is modified by considering all the devices of the circuit design data 111 apart from those which have been discarded in the second phase of the method and those that have been already considered in the calculations of the first and second phases of the method. In the selection of the devices of the first dynamic list, grouping information and building blocks information may be considered as already explained above with respect to the first phase of the method. For example, one should note that, when the selected device of a building block comprises a group of parallel devices, the circuit sensitivity optimiser 121 may communicate to the circuit simulator 122 with respect to one device among the group of parallel devices as explained above.

Also, in the third phase of the method, the second dynamic list is further modified by considering all the process parameters associated with the devices of the first dynamic list apart from those which have been discarded is the second phase of the method. In the example of FIG. 4C, only the process parameters ""b", "c", "d", "e", "f", "g" and "h" are considered.

Further, in response to the reception of the first and second dynamic lists, the circuit simulator 122 may calculate and communicate to the circuit sensitivity calculator 123 at least one calculated performance metrics of the circuit design data 111 as already explained above with respect to the first phase of the method, for instance.

In S410, the circuit sensitivity calculator 123 calculates and communicates back to the circuit sensitivity optimiser 121 a variance of the calculated performance metrics as already explained above with respect to the first phase of the method, for instance. As indicated in FIG. 4C, 40 simulations (i.e. 5*8) may be performed to obtain the variance using formula (3) as explained above. The number of devices within building blocks is represented by the "Weighting" field as already explained above.

In S420, the circuit sensitivity optimiser 121 compares the variance of the performance metrics with, for example, a given tolerance value associated with a predefined circuit specification data 112 associated with the performance metrics. Hence, if the variance of the performance metrics does not match the given tolerance value, then the user may be invited to change the circuit design in S430 prior to running again the circuit sensitivity analysis in S300 with respect to the modified circuit design. However, if the variance of the performance metrics matches the given tolerance value, then in S340 the method would stop.

The skilled person would appreciate that the proposed solution may be embodied by way of a method based on dynamic lists of devices and process parameters (i.e. first and second dynamic lists described above) wherein the method gradually provides to a design user the possibility to stop or not the design process at an early stage with respect to a design target, for example. This helps the design engineer making faster decisions regarding its design, such as changing the size of the devices, since it is not necessary to wait for a thorough analysis of the whole circuit. This also helps obtaining circuit sensitivity information about a circuit design in a quicker way at several gradual stages compared to prior art teachings such as in the "brute-force" method wherein all circuit sensitivity information are obtained at the end of thorough analysis of a given circuit.

Although the description has been presented mainly based on transistors, devices such as resistors or capacitors may be considered as well. Of course, the above advantages are exemplary, and these or other advantages may be achieved by the proposed solution. Further, the skilled person will appreciate that not all advantages stated above are necessarily achieved by embodiments described herein.

The proposed solution may also be implemented in a computer program product stored in a non-transitory computer-readable storage medium that stores computer-executable code which causes a processor computer to perform a method according to the proposed solution.

A computer program product is a list of instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for example include at least one processing unit, associated memory and a number of input/output (I/O) devices. When executing the computer program, the computer system processes information according to the computer program and produces resultant output information via I/O devices.

In the foregoing specification, the proposed solution has been described with reference to specific examples of embodiments of the proposed solution. It will, however, be evident that various modifications and changes may be made therein without departing from the broader scope of the proposed solution as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. For example, circuit sensitivity calculator 123 may be combined with the circuit sensitivity optimiser 121.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermedial devices. Likewise, any two devices so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the proposed solution is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A design tool apparatus for designing an integrated circuit for improving circuit sensitivity calculations of the integrated circuit, the apparatus comprising:
   a processing resource configured to support a circuit sensitivity optimiser, a circuit sensitivity calculator, and a circuit simulator configured to communicate with the circuit sensitivity optimiser and the circuit sensitivity calculator, wherein:
   the circuit sensitivity optimiser is configured to communicate to the circuit simulator:
   a first dynamic list of one or more devices selected out of a plurality of devices of the circuit and
   a second dynamic list of one or more process parameters selected out of a plurality of process parameters, and associated with the one or more selected devices of the first dynamic list;
   the circuit simulator is configured to communicate to the circuit sensitivity calculator at least one performance metric (f) associated to the circuit in response to the reception of the first dynamic list and of the second dynamic list;
   the circuit sensitivity calculator is configured to determine at least one sensitivity coefficient ($S_i^f$) for each of the devices of the first dynamic list in response to the reception of the performance metric from the circuit simulator, said sensitivity coefficient of a given device corresponding to a deviation of the performance metrics due to a variation in one or more values of the process parameters associated with the manufacturing process for said device;
   the circuit sensitivity calculator is further configured to determine and communicate to the circuit sensitivity optimiser a variance ($\sigma^2$) of the performance metrics with respect to the sensitivity coefficients; and,
   based on the variance of the performance metrics, the circuit sensitivity optimiser is further configured to determine whether or not to continue communicating with the circuit simulator;
   fabricating the integrated circuit based upon the circuit sensitivity calculations;
   wherein the circuit sensitivity optimiser is further configured to select one device of one branch of a multi-branches building block configured to balance currents through all branches of said multi-branches building block.

2. The apparatus of claim 1, wherein the circuit sensitivity optimiser is further configured to select one device from a group of parallel devices.

3. The apparatus of claim 2 wherein the circuit sensitivity calculator is configured to determine the variance of the performance metrics using the following formula:

$$\sigma^2 = \sum_i n \times \left(S_i^f\right)^2 \times \sigma_{x_i}^2$$

where:
   $\sigma^2$ is the variance of the performance metrics;
   $S_i^f$ is the sensitivity coefficient of a $i^{th}$ process parameter for a performance metric f;

n is the number of devices within building blocks; and,
$\sigma_{x_i}^2$ is a known variance of a $i^{th}$ process parameter with respect to its nominal value.

4. The apparatus of claim 1, wherein the building block comprises a current-mirror or a differential pair of transistors.

5. The apparatus of claim 1, wherein the circuit sensitivity optimiser is further configured to deselect from the first dynamic list, devices having a sensitivity coefficient with respect to a known main process parameter of the integrated technology used by the circuit, lower than a first value.

6. The apparatus of claim 1, wherein the circuit sensitivity optimiser is further configured to deselect from the second dynamic list, remaining process parameters different from the main process parameter, yielding in a sensitivity coefficient lower than a second value.

7. The apparatus of claim 1, wherein the circuit sensitivity optimiser is further configured to communicate with the circuit simulator if the variance of the performance metrics matches a given tolerance value associated with a predefined circuit specification data associated with the performance metrics.

8. The apparatus of claim 1, further comprising circuit design data defining devices of the circuit, wherein the devices comprises one or more transistors or one or more resistors.

9. A method of designing an integrated circuit, the method comprising:
  a circuit sensitivity optimiser generating:
    a first dynamic list of one or more devices selected out of a plurality of devices of the circuit, and
    a second dynamic list of one or more process parameters selected out of a plurality of process parameters, and associated with the one or more selected devices of the first dynamic list;
  a circuit simulator calculating at least one performance metrics (f) associated to the circuit with respect to the first dynamic list and second dynamic list;
  a circuit sensitivity calculator determining at least one sensitivity coefficient ($S_i^f$) for each of the devices of the first dynamic list with respect to the performance metrics, said sensitivity coefficient of a given device corresponding to a deviation of the performance metrics due to a variation in one or more values of the process parameters associated with the manufacturing process for said device;
  the circuit sensitivity calculator further determining a variance ($\sigma^2$) of the performance metrics with respect to the sensitivity coefficients; and,
  based on the variance of the performance metrics, the circuit sensitivity optimiser further gradually determining whether or not to continue calculating performance metrics;
  fabricating the integrated circuit based upon the circuit sensitivity calculations;
  further comprising selecting one device of one branch of a multi-branches building block adapted to balance currents through all said multi-branches building block.

10. The method of claim 9, further comprising selecting one device from a group of parallel devices.

11. The method of claim 9; wherein the multi-branches building block comprises a current-mirror or a differential pair of transistors.

12. The method of claim 9, further comprising:
  deselecting from the first dynamic list, devices having a sensitivity coefficient with respect to a known main process parameter of the integrated technology used by the circuit, lower than a first value.

13. The method of claim 9, further comprising:
  deselecting from the second dynamic list, remaining process parameters different from the main process parameter, yielding in a sensitivity coefficient lower than a second value.

14. The method of claim 9, wherein determining whether to further calculate performance metrics comprises checking whether the variance of the performance metrics matches a given tolerance value associated with a predefined circuit specification data associated with the performance metrics.

15. A design tool apparatus for designing an integrated circuit for improving circuit sensitivity calculations of the integrated circuit, the apparatus comprising:
  a processing resource configured to support a circuit sensitivity optimiser, a circuit sensitivity calculator, and a circuit simulator configured to communicate with the circuit sensitivity optimiser and the circuit sensitivity calculator, wherein:
  the circuit sensitivity optimiser is configured to communicate to the circuit simulator:
    a first dynamic list of one or more devices selected out of a plurality of devices of the circuit and
    a second dynamic list of one or more process parameters selected out of a plurality of process parameters, and associated with the one or more selected devices of the first dynamic list;
  the circuit simulator is configured to communicate to the circuit sensitivity calculator at least one performance metric (f) associated to the circuit in response to the reception of the first dynamic list and of the second dynamic list;
  the circuit sensitivity calculator is configured to determine at least one sensitivity coefficient ($S_i^f$) for each of the devices of the first dynamic list in response to the reception of the performance metric from the circuit simulator, said sensitivity coefficient of a given device corresponding to a deviation of the performance metrics due to a variation in one or more values of the process parameters associated with the manufacturing process for said device;
  the circuit sensitivity calculator is further configured to determine and communicate to the circuit sensitivity optimiser a variance ($\sigma^2$) of the performance metrics with respect to the sensitivity coefficients; and,
  based on the variance of the performance metrics, the circuit sensitivity optimiser is further configured to determine whether or not to continue communicating with the circuit simulator;
  fabricating the integrated circuit based upon the circuit sensitivity calculations;
  wherein the circuit sensitivity optimiser is further configured to communicate with the circuit simulator if the variance of the performance metrics matches a given tolerance value associated with a predefined circuit specification data associated with the performance metrics.

* * * * *